US012411510B2

(12) United States Patent
Lin

(10) Patent No.: US 12,411,510 B2
(45) Date of Patent: Sep. 9, 2025

(54) LOW-POWER FAST-TRANSIENT LOW-DROPOUT (LDO) REGULATOR WITH DIRECT FEED-FORWARD

(71) Applicant: Cypress Semiconductor Corporation, San Jose, CA (US)

(72) Inventor: Adrian Lin, Austin, TX (US)

(73) Assignee: Cypress Semiconductor Corporation, San Jose, CA (US)

( * ) Notice: Subject to any disclaimer, the term of this patent is extended or adjusted under 35 U.S.C. 154(b) by 355 days.

(21) Appl. No.: 18/177,039

(22) Filed: Mar. 1, 2023

(65) Prior Publication Data

US 2024/0295890 A1 Sep. 5, 2024

(51) Int. Cl.
*G05F 1/575* (2006.01)
*G05F 1/46* (2006.01)
*G05F 3/26* (2006.01)

(52) U.S. Cl.
CPC .............. *G05F 1/575* (2013.01); *G05F 1/468* (2013.01); *G05F 3/262* (2013.01)

(58) Field of Classification Search
CPC ........... G05F 1/575; G05F 1/468; G05F 3/262
See application file for complete search history.

(56) References Cited

U.S. PATENT DOCUMENTS

| | | | | |
|---|---|---|---|---|
| 9,946,283 | B1 * | 4/2018 | Yung | G05F 1/575 |
| 9,989,981 | B1 * | 6/2018 | Du | G05F 1/61 |
| 2013/0033247 | A1 * | 2/2013 | Endo | G05F 1/575 323/282 |
| 2014/0117956 | A1 * | 5/2014 | Price | G05F 1/575 323/273 |
| 2023/0045744 | A1 * | 2/2023 | Jung | G11C 11/4093 |
| 2024/0072801 | A1 * | 2/2024 | Tang | H03F 3/45183 |
| 2024/0275348 | A1 * | 8/2024 | Vigilante | H03F 3/45192 |
| 2024/0364215 | A1 * | 10/2024 | Lin | H02M 1/0006 |

* cited by examiner

*Primary Examiner* — Sisay G Tiku

(57) ABSTRACT

A low-dropout (LDO) regulator includes a voltage reference node and a one-stage differential amplifier coupled to the voltage reference node. The one-stage differential amplifier includes: a differential pair of NMOS transistors; a mirroring load comprising a first current source and a PMOS transistor; a direct feed-forward (DFF) loop formed by the PMOS transistor and its parasitic gate-to-drain capacitance during a load transient; and an indirect regulation feedback (IRF) loop formed by the differential pair of NMOS transistors, a resistor, and the PMOS transistor to provide direct current (DC) voltage regulation.

19 Claims, 8 Drawing Sheets

600

LOW-POWER FAST-TRANSIENT LOW-DROPOUT (LDO) REGULATOR WITH DIRECT FEED-FORWARD

TECHNICAL FIELD

The disclosure relates to the field of power supply or voltage supply to loads (e.g., circuit blocks requiring a supply voltage), in particular to a low-power fast-transient low-dropout (LDO) regulator with direct feed-forward.

BACKGROUND

Electronic circuits may include individual electronic components, such as resistors, transistors, and capacitors, among others, connected by conductive wires or traces through which electric current can flow. Electronic circuits may be constructed using discrete components, or more commonly integrated in an integrated circuit (IC) where the components and interconnections are formed on a common substrate, such as silicon.

BRIEF DESCRIPTION OF THE DRAWINGS

The disclosure is illustrated by way of example, and not of limitation, in the figures of the accompanying drawings.

DETAILED DESCRIPTION

Figure 1:
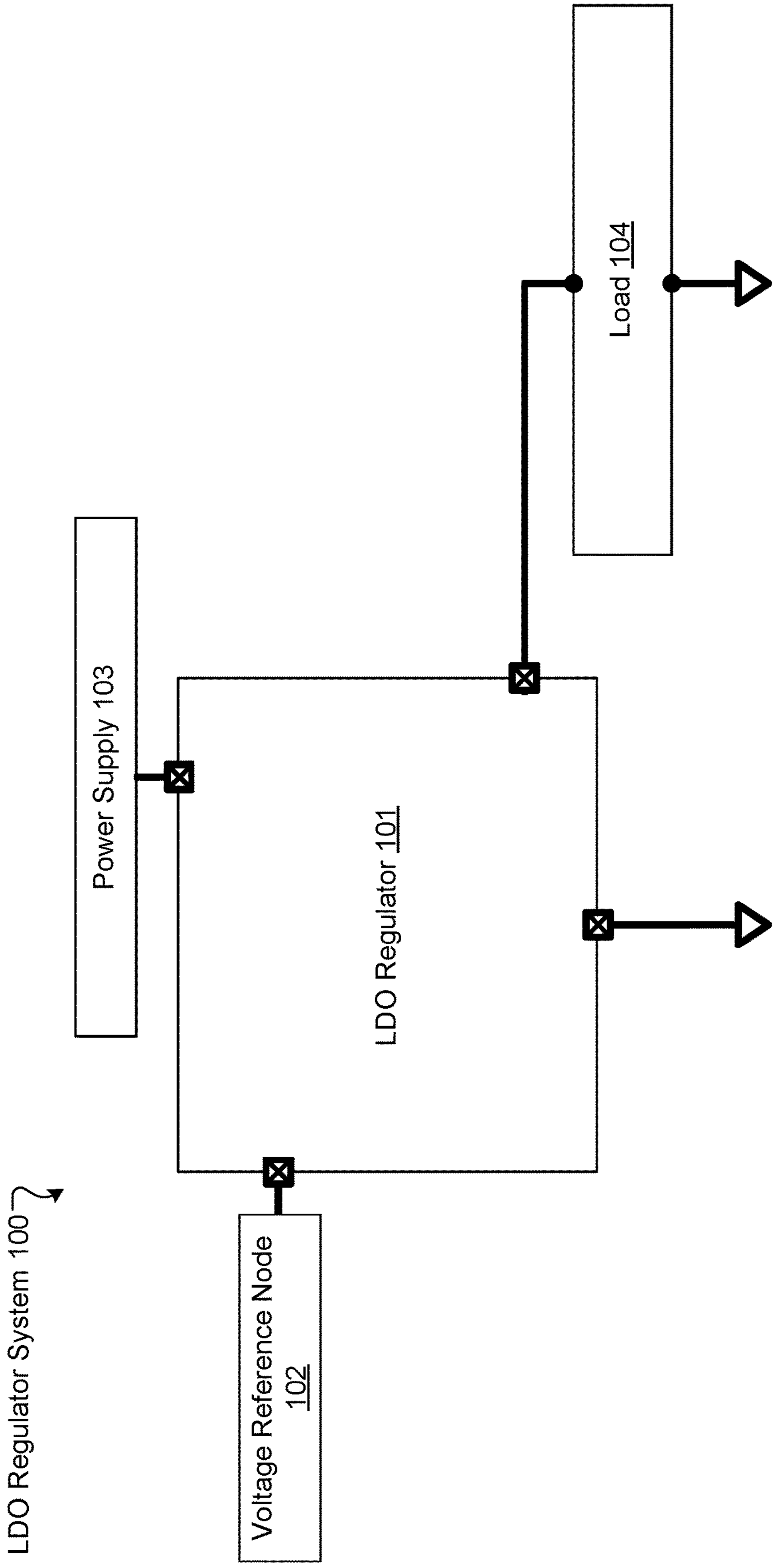
FIG. 1 is a block diagram of a low-dropout (LDO) regulator system 100, according to some embodiments.

Digital integrated circuits (ICs) such as a microcontroller unit (MCU) may use a gate oxide (Gox) device with a 1.8 V breakdown voltage (1.8 V Gox device). A power management unit (PMU) may require, for example, a Gox device with a 2.5 V breakdown voltage (2.5 V Gox device) to allow a continuous range switching regulator to supply 1.6 to 4.8 V for operation. Process limitations in 28 nm and 22 nm technologies (and smaller) prevent the use of a 2.5 V Gox device and a 1.8 V Gox device on the same die. Thus, only a 1.8 V Gox device may be available for an MCU and PMU on the same die. When a 1.8 V Gox device is used on a chip, the chip needs a 1.8 V external power supply. No existing solution provides the 1.8 V power supply on the chip. A low-power fast-transient low-dropout (LDO) with direct feed-forward architecture eliminates the need for an external power supply (regulator) because it can be directly integrated on the chip while maintaining competitive power consumption.

Conventional LDO regulators use a closed-loop three-stage op-amp architecture. Thus, conventional LDO regulators require more current to increase feed-forward bandwidth, and the stability of the overall system limits the feed-forward bandwidth. A three-stage closed-loop system is challenging to stabilize and relies on an output capacitance to stabilize the system—requiring the use of an external capacitor. Further, a relatively high minimum load current is required to maintain the transconductance of a mirror-loading transistor to improve loop bandwidth and stability. Conventional LDO regulators do not supply voltage on the chip but are rather external power supplies.

The devices, systems, and methods disclosed herein provide a low-power fast-transient LDO regulator with direct feed-forward.

A LDO regulator includes a voltage reference node and a one-stage differential amplifier coupled to the voltage reference node, the one-stage differential amplifier including: a differential pair of NMOS transistors; a mirroring load comprising a first current source and a PMOS transistor; a direct feed-forward (DFF) loop formed by the PMOS transistor and its parasitic gate-to-drain capacitance during a load transient; and an indirect regulation feedback (IRF) loop formed by the differential pair of NMOS transistors, a resistor, and the PMOS transistor to provide direct current (DC) voltage regulation.

In some examples, the differential pair of NMOS transistors includes: a second current source; a first NMOS transistor coupled to the voltage reference node, the first current source, and the second current source; and a second NMOS transistor coupled to the second current source and the resistor, wherein a gate of the second NMOS transistor is coupled to a drain of the second NMOS transistor.

In some examples, the first NMOS transistor of the differential pair is coupled to the second current source, wherein a source of the first NMOS transistor of the differential pair is coupled to a source of the second NMOS transistor of the differential pair.

In some examples, the first current source is coupled between a gate of the PMOS transistor and a source of the PMOS transistor, wherein the gate of the PMOS transistor is coupled to a drain of a first NMOS transistor of the differential pair.

In some examples, the LDO regulator further includes a regulated voltage node, wherein the one-stage differential amplifier is coupled between the voltage reference node and the regulated voltage node.

In some examples, the LDO regulator further includes a capacitor, wherein the capacitor is coupled to the resistor, a drain of the PMOS transistor, and the regulated voltage node.

In some examples, the capacitor increases a power supply rejection ratio (PSRR) of the LDO regulator and reduces undershoot and overshoot during load transients.

Aspects of the present disclosure result in technological advantages. The present disclosure avoids the requirement for more current to increase feed-forward bandwidth. The present disclosure describes a naturally stable system in which the feed-forward bandwidth is not limited by the stability of the overall system. The present disclosure is naturally stable and does not rely on an output capacitance to stabilize the system. No use of an external capacitor is required for stabilization. Further, the present disclosure only requires a relatively low minimum load current to maintain transconductance of the mirror-loading transistor for improving loop bandwidth and stability. Further, the present disclosure eliminates dependency on an external regulator because it can be directly integrated on the chip while maintaining competitive power consumption (e.g., power supply depleted at a slower rate). The design simplicity of the present disclosure allows for quick and scalable implementation.

FIG. 1 is a block diagram of a LDO regulator system 100 (also referred to as "system" herein). System 100 includes an LDO regulator 101. An example of an LDO regulator is shown and discussed in further detail in FIGS. 2A-B. In some embodiments, LDO regulator 101 may be coupled to a voltage reference node 102. In some embodiments, the voltage level at the voltage reference node may be a reference voltage. A reference voltage may be an electronic device or component that produces a constant output voltage regardless of variations in external conditions such as temperature, barometric pressure, humidity, current demand, power supply changes, and/or the passage of time, etc.

In one embodiment, the LDO regulator 101 may be an integrated circuit coupled to voltage reference node 102. The LDO regulator 101 and the voltage reference node 102 can be implemented on the same or different circuit boards. In another embodiment, the LDO regulator 101 is integrated into a single die with the voltage reference node 102. In another embodiment, the LDO regulator 101 and the voltage reference node 102 can be implemented on two dies and one package. Alternatively, the LDO regulator 101 and the voltage reference node 102 can be implemented in other configurations.

In some embodiments, LDO regulator 101 may be coupled to a power supply 103. In some embodiments, a power supply may be an electrical device that supplies electric power to an electrical load. For example, in some embodiments, a power supply may be a lithium-ion battery, coin cell battery, switching regulator, generator, solar power supply, DC-to-DC converter, AC-to-DC power supply, and/or the like. In the illustrated embodiment, the LDO regulator 101 is coupled to a power supply 103. In some embodiments, the power supply 103 includes a battery, such as a rechargeable Lithium-ion battery or a switching regulator. Alternatively, the power supply 103 can be other types of power supplies.

In some embodiments, the LDO regulator may be coupled to a load 104. In some embodiments, a load may be an electrical component or portion of a circuit that consumes electric power (e.g., Wi-Fi, Bluetooth, MCU, etc.). In some embodiments, load 104 may be integrated on the same chip as LDO regulator 101 or a different chip.

Figure 2A:
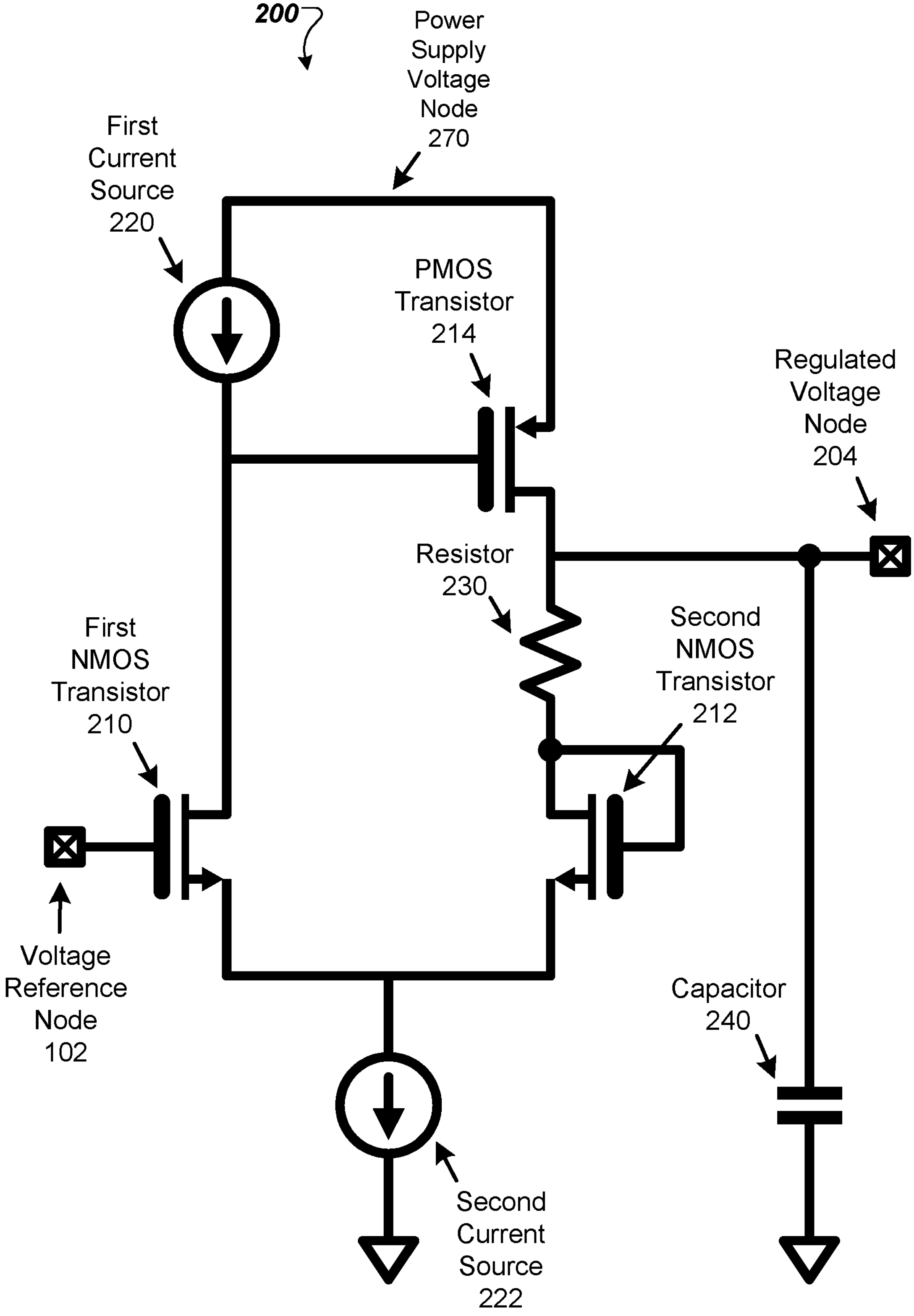
FIGS. 2A-B are circuit diagrams illustrating a low-power fast-transient LDO regulator with direct feed-forward 200, according to some embodiments.
Figure 2B:
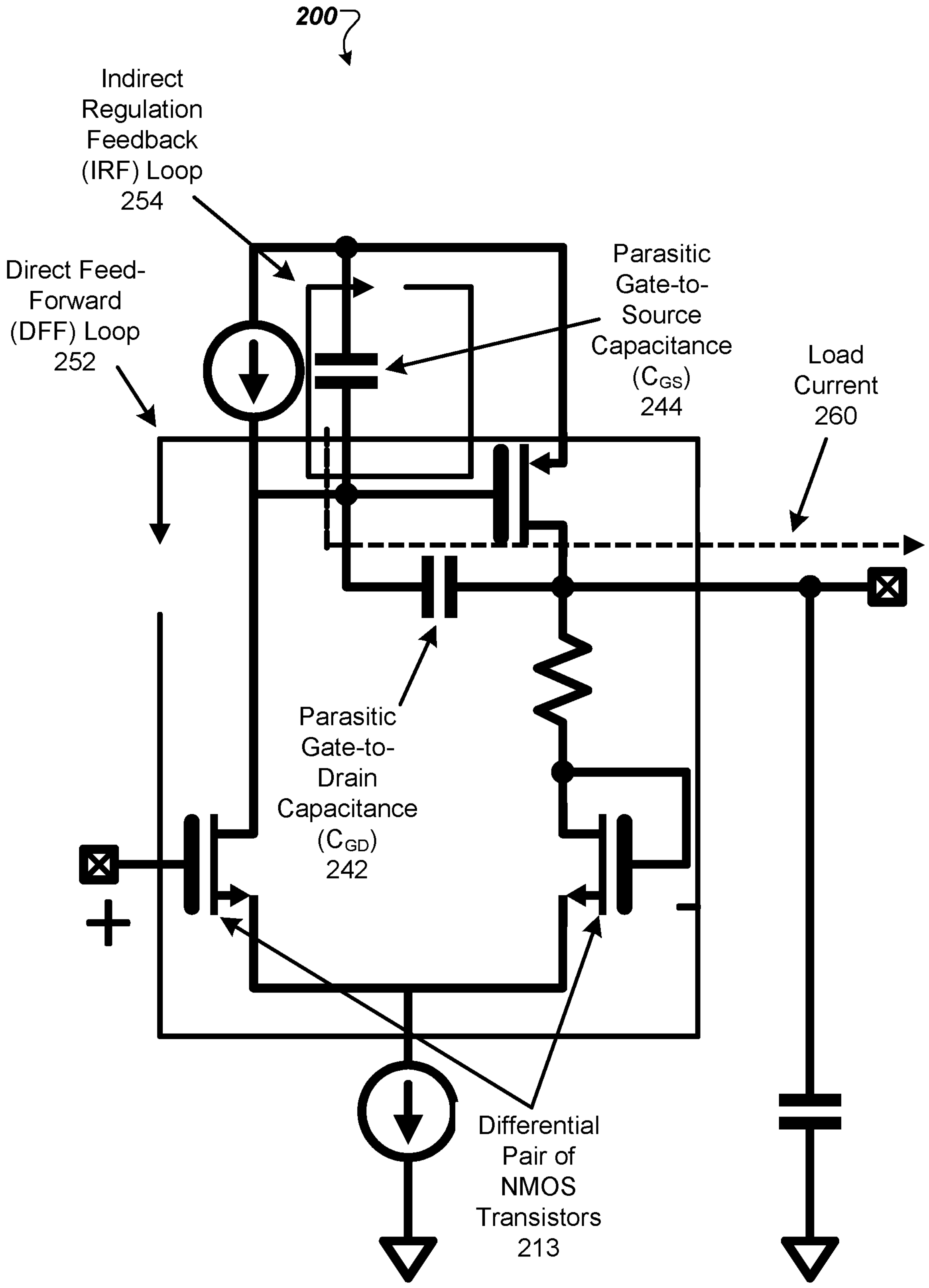

FIGS. 2A-B are a circuit diagrams illustrating a low-power fast-transient LDO regulator with direct feed-forward 200, according to some embodiments. Low-power fast-transient LDO regulator with direct feed-forward 200 may be similar to LDO regulator system 100 or LDO regulator 101 and may be described with respect to FIG. 1. For convenience and clarity, the numbers of components used in FIG. 1 are used in the present Figures. Low-power fast-transient LDO regulator with direct feed-forward 200 includes voltage reference node 102. In other embodiments, the LDO regulator may include the same, more, or fewer components. LDO regulator 101 is illustrated as a discrete device (e.g., an integrated circuit with input and output pins) for purposes of illustration, rather than limitation.

In some embodiments, the source of a PMOS transistor 214 may be coupled to a first terminal of a first current source 220. In some embodiments, a gate of the PMOS transistor 214 may be coupled to a second terminal of the first current source 220 and a drain of a first NMOS transistor 210. In some embodiments, a drain of the PMOS transistor 214 may be coupled to a first terminal of a resistor 230, a first terminal of a capacitor 240, and a regulated voltage node 204. In some embodiments, a second terminal of capacitor 240 may be coupled to a ground (e.g., signal ground, circuit ground, system ground, etc.). In some embodiments, a source of a first NMOS transistor 210 may be coupled to a source of a second NMOS transistor 212. In some embodiments, the source of the first NMOS transistor 210 may be coupled to a first terminal of a second current source 222. In some embodiments, a second terminal of the second current source 222 may be coupled to a ground (e.g., signal ground, circuit ground, system ground, etc.). In some embodiments, a gate of the second NMOS transistor 212 may be coupled to a drain of the second NMOS transistor 212 and a second terminal of resistor 230.

It should be noted that capacitor 240 and second current source 222 can be coupled to a ground or a ground potential, such as a device ground. It may be noted that the ground symbols in the Figures may refer to device ground (e.g., ground of LDO regulator system 100), unless otherwise described.

In some embodiments, first current source 220 and PMOS transistor 214 operate as an amplifier mirroring load.

In some embodiments, PMOS transistor 214 and the parasitic gate-to-drain capacitance ($C_{GD}$) 242 of PMOS transistor 214 operate as a DFF loop 252 during a fast load transient on regulated voltage node 204.

In some embodiments, second current source 222; first NMOS transistor 210 coupled to the voltage reference node 102, first current source 220, and second current source 222; and second NMOS transistor 212 coupled to second current source 222 and resistor 230, wherein a gate of the second NMOS transistor 212 is coupled to a drain of the second NMOS transistor 212 may form a differential pair of NMOS transistors 213.

In some embodiments, the differential pair of NMOS transistors 213, resistor 230, and PMOS transistor may form an IRF loop 254. In some embodiments, IRF loop 254 may provide DC voltage regulation on regulated voltage node 204.

In some embodiments, voltage reference node 102 may correspond to a reference voltage ($V^{REF}$). In some embodiments, $V^{REF}$ may be a bandgap voltage reference. A bandgap voltage reference may refer to a temperature-independent voltage reference that produces a constant voltage regardless of power supply variations, temperature changes, or circuit loading. In some embodiments, the accuracy of a bandgap voltage reference is 1% or less. In some embodiments, $V^{REF}$ may be the bandgap voltage ($V^{BG}$) or may be derived from $V^{BG}$.

In some embodiments, first current source 220 may correspond to a first current value. In some embodiments, the first current value may be calculated as half of a bias current ($I_{BIAS}$) (e.g., First Current Value=0.5*$I_{BIAS}$). $I_{BIAS}$ may be derived from $V_{BG}$ and a bandgap resistance ($R_{BG}$). In some embodiments, $I_{BIAS}$ may be calculated as a ratio of $V_{BG}$ to $R_{BG}$ (e.g., $I_{BIAS}=V_{BG}/R_{BG}$).

In some embodiments, IRF loop 254 may force a diode voltage to be equal to $V_{REF}$. In some embodiments, the IRF loop 254 may force $I_{BIAS}$ to flow through resistor 230. In some embodiments, the gate of second NMOS transistor 212 may not connect directly to regulated voltage node 204, making the regulation feedback loop 254 an indirect regulation feedback loop.

In some embodiments, resistor 230 may correspond to a resistance value (R). In some embodiments, a regulation voltage ($V_{REG}$) may correspond to the voltage at regulated voltage node 204 and may be derived by the following equations:

$$V_{REG} = V_{REF} + 0.5 * I_{BIAS} * R$$

$$V_{REG} = V_{BG} + \frac{V_{BG} R}{2R_{BG}}$$

$$V_{REG} = V_{BG}\left(1 + \frac{R}{2R_{BG}}\right).$$

In some embodiments, during a fast load transient, the parasitic $C_{GD}$ 242 of PMOS transistor 214 may allow a load current to charge a parasitic gate-to-source capacitance ($C_{GS}$) 244 of PMOS transistor 214 via a DFF loop 252. In some embodiments, the DFF loop 252 may be formed by PMOS transistor 214 and its parasitic $C_{GD}$ 242 during a load transient. In some embodiments, a transconductance gain ($gm_{PMOS}$) corresponds to PMOS transistor 214. The unity gain bandwidth of DFF loop 252 ($DFF_{UGBW}$) may be approximated by:

$$DFF_{UGBW} = \frac{gm_{PMOS}}{2\pi(C_{GS} + C_{GD})}.$$

Compared to conventional systems, the quiescent current ($I_{dq}$) needed to bias the LDO regulator can be relatively low because the IRF loop is only needed for DC regulation, hence the bandwidth can be very low. The $I_{dq}$, for example, may be as low as 60 nanoamps.

In some embodiments, the DFF loop is "on-demand" (only during transient) and uses the load current itself. No extra $I_{dq}$ is required for the DFF loop. The DFF bandwidth can be very high (e.g., in the MHz range) and is directly proportional to the load current (e.g., larger load current $\propto$ larger transconductance gain of the mirror-loading transistor), thus allowing for a fast-transient response. The LDO regulator system 100 is inherently stable due to its single-stage topology meaning a compensation network is not needed, and an external capacitor is not required for stability. In some embodiments, a load capacitance (e.g., capacitor 240) may improve PSRR and reduce the undershoot and overshoot during load transients.

In some embodiments, a power supply 103 (e.g., a lithium-ion battery, coin cell battery, generator, solar power supply, DC-to-DC converter, AC-to-DC power supply, and/or the like) may be coupled between first current source 220 and the source of PMOS transistor 214. In some embodiments, a power supply voltage node 270 is coupled to first current source 220 and the source of PMOS transistor 214. In some embodiments, power supply voltage node 270 corresponds to power supply 103 and a power supply voltage ($V_{PS}$).

In some embodiments, load current 260 is pulled from a power supply 103 corresponding to power supply voltage node 270 and charges parasitic Cos 244 to pull down the gate of PMOS transistor 214.

Figure 3:
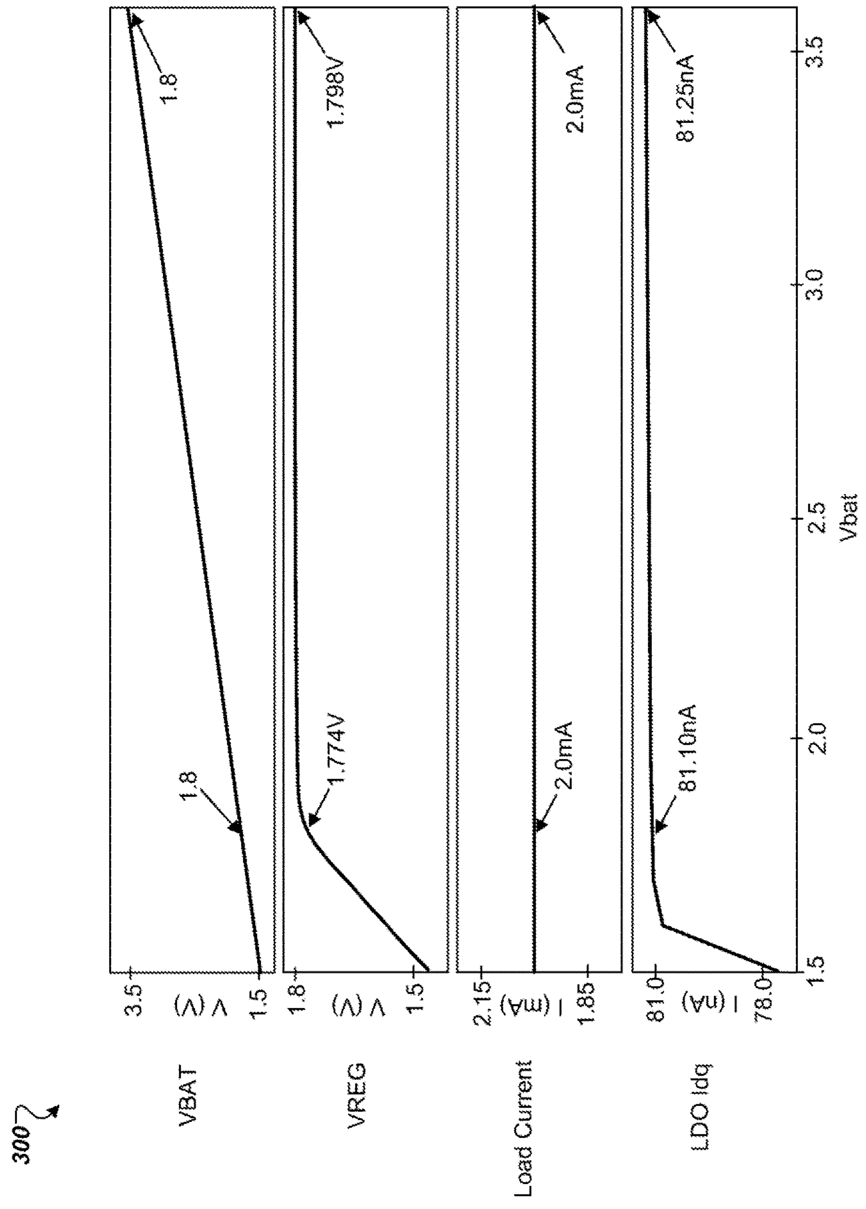
FIG. 3 is a waveform diagram illustrating LDO regulation at a maximum load, according to some embodiments.

FIG. 3 is a waveform diagram illustrating LDO regulation at a maximum load 300, according to some embodiments. For example, at a constant maximun load current of 2 microamps and a battery voltage ($V_{BAT}$, e.g., $V_{PS}$) ranging from 1.5 volts to 3.6 volts, $V_{REG}$ is approximately a constant 1.8 volts while $V_{BAT}$ voltage ranges from 1.8 to 3.6 volts with a drop-out of approximately 25 millivolts at a $V_{BAT}$ voltage of 1.8 volts. Further, at a constant maximun load current of 2 microamps and a $V_{BAT}$ (e.g., $V_{PS}$) ranging from 1.5 volts to 3.6 volts, the $I_{dq}$ is approximately 80 nanoamps over the range of $V_{BAT}$ 1.8 to 3.6 volts.

Figure 4:
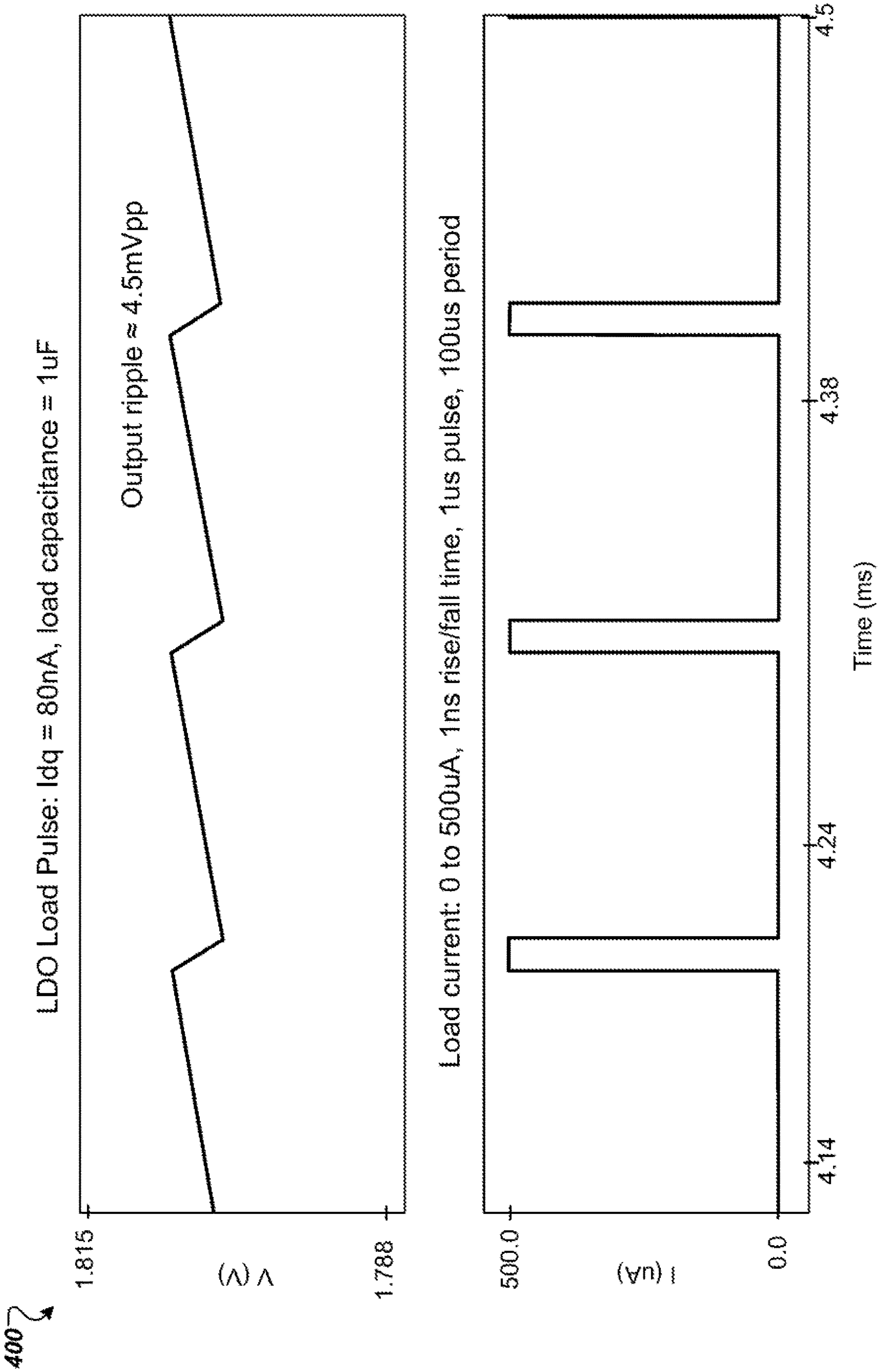
FIG. 4 is a waveform diagram illustrating an LDO regulation load pulse and output ripple, according to some embodiments.

FIG. 4 is a waveform diagram illustrating an LDO regulation load pulse and output ripple 400, according to some embodiments. In some embodiments, under fast load conditions, for example, when an LDO load pulse with an $I_{dq}$ of 80 nanoamps and a load capacitance (e.g., capacitor 240) of 1 microfarad pulses from 0 to 500 microamps with a pulse time of 1 microsecond, a rise/fall time of 1 nanosecond, and period of 100 microseconds, the output ripple is approximately 4.5 millivolts peak to peak.

Figure 5:
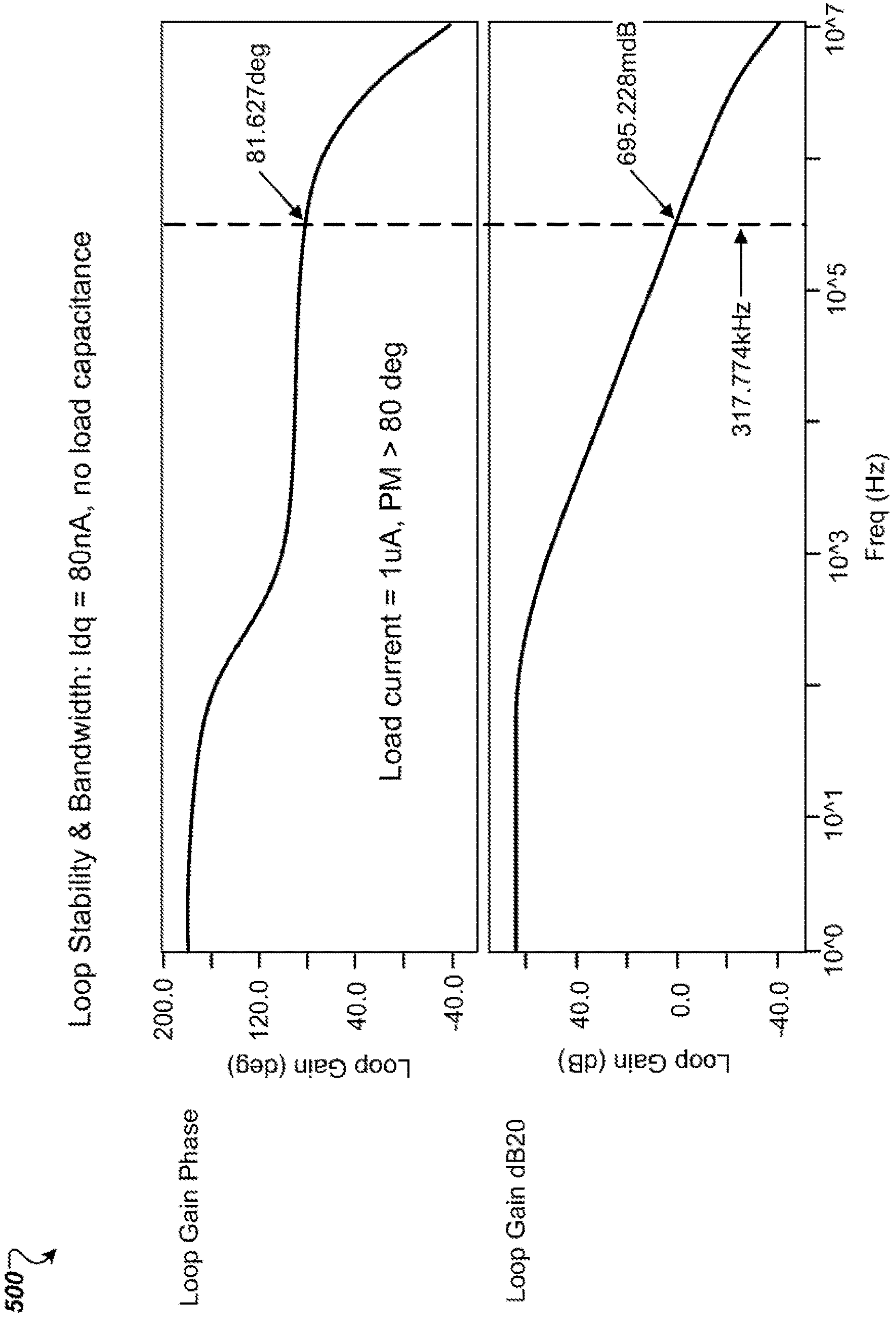
FIG. 5 is a waveform diagram illustrating LDO regulation loop stability and bandwidth, according to some embodiments.

FIG. 5 is a waveform diagram illustrating LDO regulation loop stability and bandwidth 500, according to some embodiments. For example, with an $I_{dq}$ of 80 nanoamps and zero load capacitance (e.g., capacitor 240 is not included in the circuit) the LDO regulation is stable regardless of load current. For example, with a load current of 1 microamp, the PM is greater than 80 degrees up to a frequency of approximately 320 kilohertz.

Figure 6:
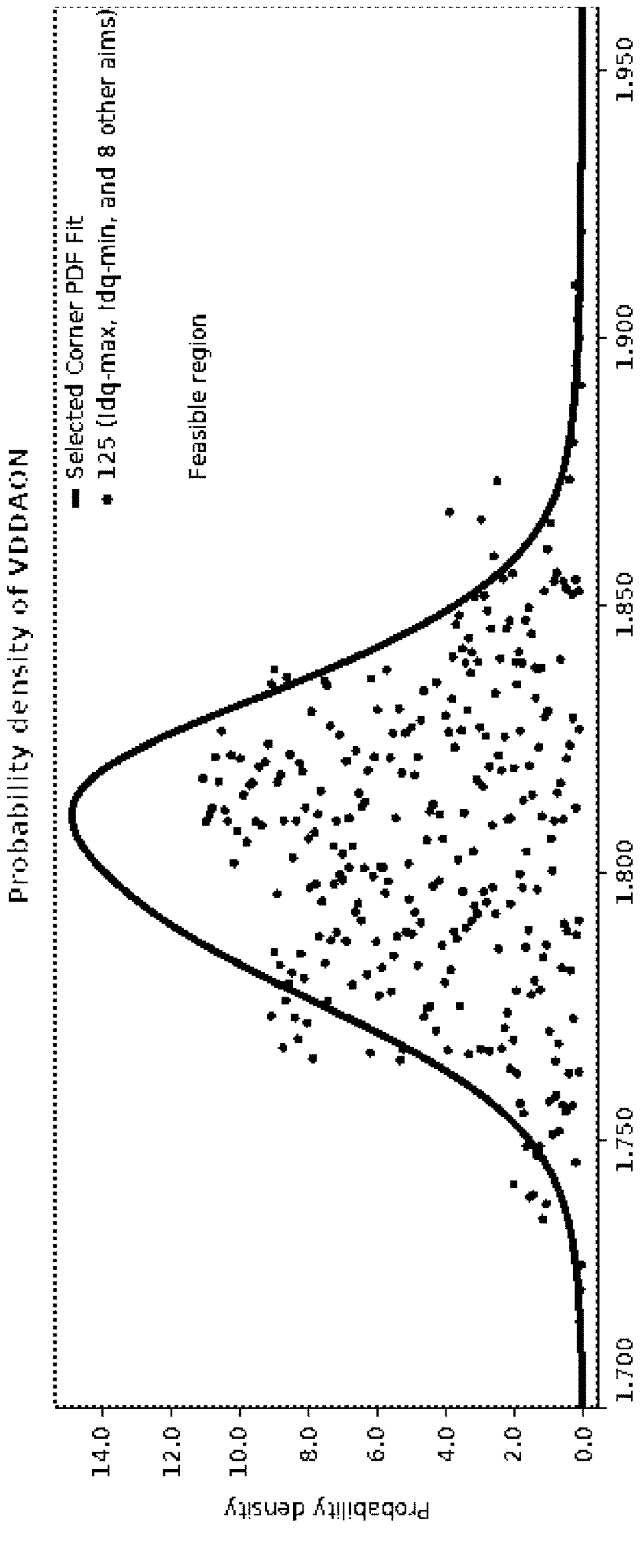
FIG. 6 is a probability density diagram illustrating LDO regulation output accuracy, according to some embodiments.

FIG. 6 is a probability density diagram illustrating LDO regulation output accuracy 600, according to some embodiments. For example, LDO regulation output accuracy at a $V_{BAT}$ voltage of 3.6 volts the LDO output regulation voltage is approximately 1.8 volts+/−4.2% (3 $\sigma$). In some embodiments, LDO regulation output accuracy at a $V_{BAT}$ voltage of 3.6 volts the LDO output regulation voltage may be approximately 1.8 volts+/−3% (3 $\sigma$).

Figure 7:
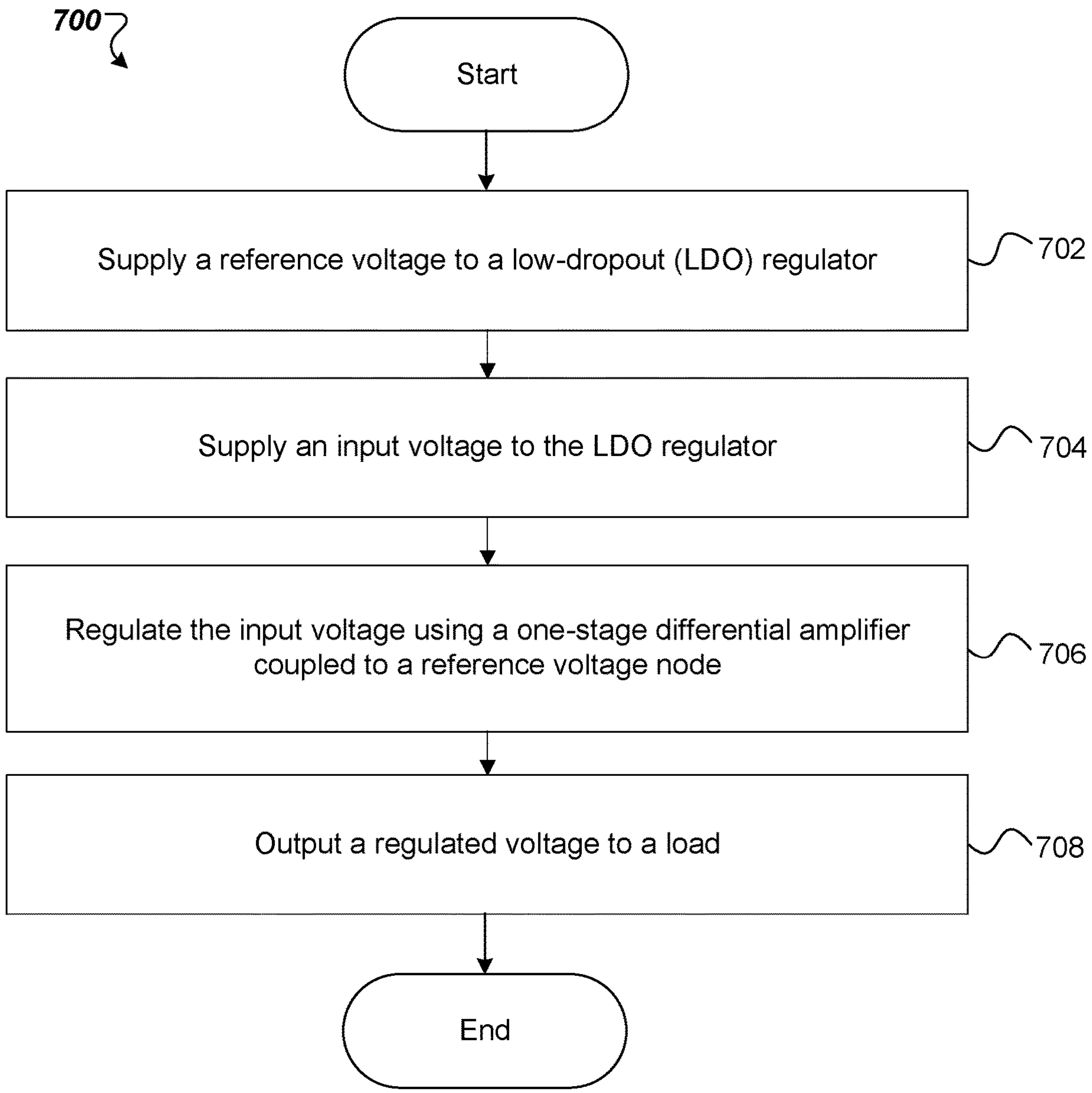
FIG. 7 is a flow diagram of a method associated with an LDO regulation, according to some embodiments.

FIG. 7 illustrates a flow diagram of a method of providing a regulated voltage to a load, according to some embodiments. The method 700 may be performed by processing logic that comprises hardware (e.g., circuitry, dedicated logic, programmable logic, microcode, etc.), software (such as instructions run on a processing device), or a combination thereof. The method 700 may be performed wholly or in part by LDO regulator 101, or components thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Method 700 begins at block 702, where processing logic performing the method supplies a reference voltage to a LDO regulator (e.g., LDO regulator 101).

At block 704, processing logic supplies an input voltage to the LDO regulator (e.g., LDO regulator 101).

At block 706, processing logic regulates the input voltage using a one-stage differential amplifier coupled to a voltage reference node (e.g., voltage reference node 102).

At block 708, processing logic outputs a regulated voltage to a load.

In some embodiments, regulating the input voltage using a one-stage differential amplifier coupled to a voltage reference node (e.g., voltage reference node 102) may include amplifying a voltage difference between a gate of a first NMOS transistor (e.g., first NMOS transistor 210) and a gate of a second NMOS transistor (e.g., second NMOS transistor 212). In some embodiments, a differential pair of NMOS transistors (e.g., differential pair of NMOS transistors 213) of the one-stage differential amplifier may include the first and the second NMOS transistors (e.g., first NMOS transistor 210 and second NMOS transistor 212). In some embodiments, regulating the input voltage using a one-stage differential amplifier coupled to a voltage reference node (e.g., voltage reference node 102) may include controlling an output current by a mirroring load, the mirroring load including a first current source (e.g., first current source 220) and a PMOS transistor (e.g., PMOS transistor 214).

In some embodiments, regulating the input voltage using a one-stage differential amplifier coupled to a voltage reference node (e.g., voltage reference node 102) may include charging a capacitor (e.g., capacitor 240) by a DFF loop (e.g., DFF loop 252). In some embodiments, the DFF loop may include a PMOS transistor (e.g., PMOS transistor 214) and its parasitic gate-to-drain capacitance (e.g., parasitic $C_{GD}$ 242) during a load transient (e.g., on regulated voltage node 204). In some embodiments, regulating the input voltage using a one-stage differential amplifier coupled to a voltage reference node (e.g., voltage reference node 102) may include causing a current diode voltage to be equal to a reference voltage and a bias current to flow through a resistor (e.g., resistor 230) by an IRF loop (e.g., IRF loop 254). In some embodiments, the IRF loop may (e.g., IRF loop 254) include the differential pair of NMOS transistors (e.g., differential pair of NMOS transistors 213), the resistor (e.g., resistor 230), and the PMOS transistor (e.g., PMOS transistor 214) to regulate the input voltage to provide DC voltage regulation (e.g., on the regulated voltage node 204).

In some embodiments, a first NMOS transistor (e.g., first NMOS transistor 210) of the differential pair (e.g., differential pair of NMOS transistors 213) may be coupled to a second current source (e.g., second current source 222). In some embodiments, a source of the first NMOS transistor of the differential pair may be coupled to a source of a second NMOS transistor (e.g., second NMOS transistor 212) of the differential pair.

In some embodiments, a first current source (e.g., first current source 220) may be coupled between a gate of a PMOS transistor (e.g., PMOS transistor 214) and a source of the PMOS transistor. In some embodiments, the gate of the PMOS transistor may be coupled to a drain of a first NMOS transistor (e.g., first NMOS transistor 210) of the differential pair of NMOS transistors. In some embodiments, the capacitor (e.g., capacitor 240) may be coupled to the resistor, a drain of the PMOS transistor, and a regulated voltage node (e.g., regulated voltage node 204).

In some embodiments, the processing logic may increase a PSRR of the LDO regulator during load transients using the capacitor (e.g., capacitor 240) coupled to the resistor (e.g., resistor 230), a drain of the PMOS transistor (e.g., PMOS transistor 214), and the regulated voltage node (e.g., regulated voltage node 204). In some embodiments, the processing logic may reduce undershoot and overshoot during load transients using the capacitor.

In the above description, numerous details are set forth. It will be apparent, however, to one of ordinary skill in the art having the benefit of this disclosure, that embodiments of the present disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "adjusting," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, the use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "some embodiments" throughout is not intended to mean the same embodiment or embodiments unless described as such.

Embodiments described herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMS, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium capable of storing, encoding, or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, and any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details, such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or presented in simple block diagram format to avoid unnecessarily obscuring the present disclosure. Thus, the specific details set forth above are merely exemplary. Particular embodiments may vary from these exemplary details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

In the above description, for purposes of explanation, numerous specific details are set forth in order to provide a thorough understanding of the present disclosure. It will be evident, however, to one skilled in the art that the present disclosure may be practiced without these specific details. In other instances, well-known circuits, structures, and techniques are not shown in detail, but rather in a block diagram in order to avoid unnecessarily obscuring an understanding of this description.

Reference in the description to "one embodiment," "an embodiment," or "some embodiments" means that a particular feature, structure, or characteristic described in connection with the embodiment(s) is included in at least one embodiment of the disclosure. The phrase "in one embodiment" or "in some embodiments" located in various places in this description does not necessarily refer to the same embodiment(s).

What is claimed is:

1. A low-dropout (LDO) regulator comprising:
- a voltage reference node; and
- a one-stage differential amplifier coupled to the voltage reference node, the one-stage differential amplifier comprising:
  - a differential pair of NMOS transistors;
  - a mirroring load comprising a first current source and a PMOS transistor;
  - a direct feed-forward (DFF) loop formed by the PMOS transistor and its parasitic gate-to-drain capacitance during a load transient; and
  - an indirect regulation feedback (IRF) loop formed by the differential pair of NMOS transistors, a resistor, and the PMOS transistor to provide direct current (DC) voltage regulation.

2. The LDO regulator of claim 1, wherein the differential pair of NMOS transistors comprises:
- a second current source;
- a first NMOS transistor coupled to the voltage reference node, the first current source, and the second current source; and
- a second NMOS transistor coupled to the second current source and the resistor, wherein a gate of the second NMOS transistor is coupled to a drain of the second NMOS transistor.

3. The LDO regulator of claim 2, wherein the first NMOS transistor of the differential pair is coupled to the second current source, wherein a source of the first NMOS transistor of the differential pair is coupled to a source of the second NMOS transistor of the differential pair.

4. The LDO regulator of claim 1, wherein the first current source is coupled between a gate of the PMOS transistor and a source of the PMOS transistor, wherein the gate of the PMOS transistor is coupled to a drain of a first NMOS transistor of the differential pair.

5. The LDO regulator of claim 1, further comprising a regulated voltage node, wherein the one-stage differential amplifier is coupled between the voltage reference node and the regulated voltage node.

6. The LDO regulator of claim 5, further comprising a capacitor, wherein the capacitor is coupled to the resistor, a drain of the PMOS transistor, and the regulated voltage node.

7. The LDO regulator of claim 6, wherein the capacitor increases a power supply rejection ratio (PSRR) of the LDO regulator and reduces undershoot and overshoot during load transients.

8. The LDO regulator of claim 1, wherein a quiescent current (ldq) is less than 2.5 microamps.

9. A method of providing a regulated voltage to a load, the method comprising:
- supplying a reference voltage to a low-dropout (LDO) regulator;
- supplying an input voltage to the LDO regulator;
- regulating the input voltage using a one-stage differential amplifier coupled to a voltage reference node, wherein regulating the input voltage comprises:
  - amplifying a voltage difference between a gate of a first NMOS transistor and a gate of a second NMOS transistor, wherein a differential pair of NMOS transistors of the one-stage differential amplifier comprises the first and second NMOS transistors;
  - controlling an output current by a mirroring load, the mirroring load comprising a first current source and a PMOS transistor;
  - charging a capacitor by a direct feed-forward (DFF) loop, the DFF loop comprising the PMOS transistor and its parasitic gate-to-drain capacitance during a load transient; and
  - causing a current diode voltage to be equal to a reference voltage and a bias current to flow through a resistor by an indirect regulation feedback (IRF) loop, the IRF loop comprising the differential pair of NMOS transistors, the resistor, and the PMOS transistor to regulate the input voltage to provide direct current (DC) voltage regulation; and
- outputting the regulated voltage to the load.

10. The method of claim 9, wherein the first NMOS transistor of the differential pair is coupled to a second current source, and wherein a source of the first NMOS transistor of the differential pair is coupled to a source of the second NMOS transistor of the differential pair.

11. The method of claim 9, wherein the first current source is coupled between a gate of the PMOS transistor and a source of the PMOS transistor, wherein the gate of the PMOS transistor is coupled to a drain of a first NMOS transistor of the differential pair of NMOS transistors; and wherein the capacitor is coupled to the resistor, a drain of the PMOS transistor, and a regulated voltage node.

12. The method of claim 11, further comprising:

increasing a power supply rejection ratio (PSRR) of the LDO regulator during load transients using the capacitor coupled to the resistor, the drain of the PMOS transistor, and the regulated voltage node; and reducing undershoot and overshoot during load transients using the capacitor.

13. A system comprising a low-dropout (LDO) regulator coupled to a power supply, a voltage reference node, and a load, wherein the LDO regulator comprises:

a one-stage differential amplifier coupled to the voltage reference node, the one-stage differential amplifier comprising:

a differential pair of NMOS transistors;

a mirroring load comprising a first current source and a PMOS transistor;

a direct feed-forward (DFF) loop formed by the PMOS transistor and its parasitic gate-to-drain capacitance during a load transient; and an indirect regulation feedback (IRF) loop formed by the differential pair of NMOS transistors, a resistor, and the PMOS transistor to provide direct current (DC) voltage regulation.

14. The system of claim 13, wherein the differential pair of NMOS transistors comprises:

a second current source;

a first NMOS transistor coupled to the voltage reference node, the first current source, and the second current source; and a second NMOS transistor coupled to the second current source and the resistor, wherein a gate of the second NMOS transistor is coupled to a drain of the second NMOS transistor.

15. The system of claim 14, wherein the first NMOS transistor of the differential pair is coupled to the second current source, wherein a source of the first NMOS transistor of the differential pair is coupled to a source of the second NMOS transistor of the differential pair.

16. The system of claim 13, wherein the first current source is coupled between a gate of the PMOS transistor and a source of the PMOS transistor, wherein the gate of the PMOS transistor is coupled to a drain of a first NMOS transistor of the differential pair.

17. The system of claim 13, further comprising a regulated voltage node, wherein the one-stage differential amplifier is coupled between the voltage reference node and the regulated voltage node.

18. The system of claim 13, further comprising a capacitor, wherein the capacitor is coupled to the resistor, a drain of the PMOS transistor, and a regulated voltage node.

19. The system of claim 18, wherein the capacitor increases a power supply rejection ratio (PSRR) of the LDO regulator and reduces undershoot and overshoot during load transients.

* * * * *